Patented Aug. 12, 1952

2,606,874

UNITED STATES PATENT OFFICE 2,606,874

WATER IN OIL EMULSIONS CONTAINING 1,2-ALKANEDIOLS AS COUPLING AGENTS

Philip James Garner, Wirral, and Philip Alan Winsor, Great Sutton, England, assignors to Shell Development Company, San Francisco, Calif., a corporation of Delaware No Drawing. Application June 8, 1948, Serial No. 31,828. In Great Britain June 23, 1947

8 Claims. (Cl. 252—308)

The present invention relates to improvements in emulsification and emulsifying compositions. The invention relates more particularly to compositions comprising oil, an emulsifying agent, and a coupling agent imparting substantially improved characteristics to the composition.

The suitability of emulsions and emulsifying compositions for use on a practical scale is governed to no small degree by properties and characteristics imparted to them by individual components therein. Thus oil emulsions, such as, for example, oil in water or water in oil emulsions, prepared with the aid of emulsifying agents are often lacking in a sufficient degree of stability. This is often particularly so where the emulsifying composition or emulsion is prepared with the aid of synthetic organic emulsifying agents. In the case of an emulsion consisting essentially of oil, water, and a specific concentration of a given emulsifier, two important factors influencing stability are the respective amounts of the two phases and the solubility of the emulsifier in the oil and water at the prevailing temperature conditions. When, as is often the case, such an emulsion serves as the base for other ingredients having some essential industrial function, such as an insecticidal, fungicidal, pharmaceutical, veterinary or a corrosion inhibiting function, the factors governing stability of the composition become more complex. Such additional components which may be dissolved or dispersed in the oil or water phase, often influence the solubility of the emulsifying agent in that phase; and by reason of their essential chemical or physical characteristics these additional ingredients will often exhibit a tendency to render unstable an otherwise stable emulsion. The production of such emulsions with the aid of commercially available synthetic organic emulsifying agents, which will possess stability characteristics of a degree enabling practical use, often presents considerable difficulties.

Underlying many of these difficulties is the circumstance that the relative solubility of the emulsifying agent in, or the relative affinity of the emulsifier for, water and oil differ to a degree which militates against any permanence of the dispersion. Many of the commercially available synthetic organic emulsifying agents suffer in this respect and exhibit a greater solubility in, or affinity for, aqueous media than they do for oleaginous media.

It is an object of the present invention to provide means whereby these adverse characteristics of such emulsifying agents can be modified in a manner which enables their being used effectively and with greater certainty to provide stable oil emulsions.

Substances are known which have the ability of adjusting the solubility of the emulsifying agent in, or affinity for, aqueous or oleaginous media. Such adjusting function has led to the description of such substances as "coupling agents." It has now been found that 1,2-alkanediols, that is, the saturated aliphatic dihydric alcohols the hydroxy groups of which are attached to the ultimate and adjacent penultimate carbon atoms of the carbon chain, and having at least seven carbon atoms to the molecule, possess to an outstanding degree the ability to adjust the solubility of the emulsifier in, or the relative affinity of the emulsifier for, aqueous or oleaginous media.

It has been found that emulsions comprising oil, water, and an emulsifying agent of substantially improved stability are obtained by the incorporation therein of a 1,2-alkanediol having at least seven carbon atoms. The presence of the 1,2-alkanediols having at least seven carbon atoms, it has been found, enables the obtaining of emulsions comprising oil and water of unusual stability even with the aid of such emulsifiers as the synthetic organic emulsifying agents having a greater solubility in, or affinity for, water than for the oil to be emulsified.

Without intent to limit the scope of the invention by any theory advanced herein to set forth more fully the nature of the invention, it is believed that the coupling agents used in the compositions of the present invention, by reason of their carbon chain and physical and chemical properties appear to exhibit a higher solubility in, or affinity for, oil than for water and to modify the solubility or affinity characteristics of the emulsifying agent without in any way inhibiting the emulsifying properties of the emulsifier. The efficiency of an alkanediol, it has been found, decreases as the hydroxyl groups recede from the end of the carbon chain, and molecules in which the two hydroxyl groups are located in the 1,2-positions exhibit decidedly superior effectiveness as coupling agents than do any other isomeric configurations. The high efficiency of the 1,2-alkanediols of seven or more carbon atoms is believed attributable to the free orientation of the diol molecules at the surface of the oil particles. However, the outstanding behavior of the class of coupling agents employed in the compositions of the present invention could in no wise be predicted from that which was hitherto known in respect of such products.

An effective coupling agent needs to possess various other properties apart from those already mentioned if it is to be capable of wide, useful industrial application. For instance, it should have a relatively low melting point in order to facilitate handling and mixing and in order that it may not tend to crystallize out from the emulsifying compositions or finished emulsions on cooling. In this respect the 1,2-alkanediols having from seven to fourteen carbon atoms to the molecule are particularly advantageous since they are liquid liquids or low melting point solids at ordinary conditions of temperature and pressure. A coupling agent should preferably be odorless; this is particularly so in many industrial applications of the emulsions containing it, for example, in pharmaceutical preparations, and in soluble cutting oils. In this respect also the 1,2-alkanediols of the present invention exhibit substantial advantage over many of the substances which have been proposed as coupling agents heretofore, such as the cresols, cyclohexanols and various monohydric alcohols which for the most part possess marked odor. Again, a satisfactory coupling agent should be capable of being employed in a wide range of concentrations. Most coupling agents employed heretofore can only be used effectively over a comparatively narrow range of concentrations outside of which range they tend to inhibit dispersibility. The 1,2-alkanediols employed in the compositions of the present invention are substantially free from such limitation.

Illustrative of the 1,2-alkanediols employed as coupling agents in the present invention are the following compounds: 1,2-heptanediol, 1,2-octanediol, 2,5-dimethyl-1,2-hexanediol, 2-methyl-1,2-octanediol, 1,2-decanediol, 2-methyl-1,2-nonanediol, 2-methyl-1,2-decanediol, 2-methyl-1,2-undecanediol, 2-methyl-1,2-dodecanediol, and their homologues. Of the 1,2-alkanediols having at least seven carbon atoms to the molecule those having from seven to fourteen carbon atoms are preferred. Preferred are the alcohols comprised within the above class illustrated by the formula

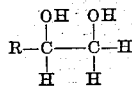

wherein R is an alkyl group having from five to twelve carbon atoms. Particularly preferred are the alcohols comprised within the class illustrated by the above empirical formula wherein R is a straight chain alkyl group having from five to twelve carbon atoms. The latter particularly preferred compounds are illustrated by the 1,2-alkanediols corresponding to 1,2-heptene, 1,2-octene, 1,2-nonene, 1,2-decene, 1,2-undecene, 1,2-dodecene, 1,2-tridecene, and 1,2-tetradecene. Of the suitable dihydric alcohols comprised within the group represented by the above empirical formula wherein R is of branched chain structure those wherein R contains an unbroken carbon chain of at least five carbons are preferred.

The emulsions and emulsifying compositions of the present invention may comprise a mixture of two or more of the 1,2-alkanediol coupling agents. The amount of the coupling agent employed may vary widely within the scope of the invention and will vary in accordance with the characteristics of the particular components, such as the oil, emulsifying agents and any other additives incorporated in the composition. Thus, the coupling agent may suitably be added in amounts ranging, for example, from about 1% to about 25% by volume of the oil component of the composition. Higher or lower proportions of the coupling agent may, however, be employed within the scope of the invention.

The 1,2-alkanediol coupling agents may be employed in combination with other coupling agents. Thus compounds such as, for example, monohydric alcohols, ethylene glycol, cresylic acids and the like may be added to the emulsions or emulsifying compositions. Thus the minimum temperature at which compositions comprising certain of the 1,2-alkanediols may be employed without fear of their crystallization may be lowered considerably by combining a 1,2-alkanediol with one or more other 1,2-alkanediols or with a totally different type of coupling agent. This result may be obtained for example by combining a certain 1,2-alkanediol having a relatively high melting point with a 1,2-alkanediol or other type of coupling agent having a substantially lower melting point. Thus 1,2-undecanediol, the melting point of which is 48° C., may be mixed with 1,2-octanediol or with a monohydric alcohol such as lauryl alcohol to result in mixtures which remain liquid at 20° C. and lower and which are highly suited for use as coupling agents in the emulsions and emulsifying compositions of the present invention.

The 1,2-alkanediols employed in the present invention may be obtained from any suitable source. They may be conveniently prepared, for example, by the action of hydrogen peroxide on the 1,2-olefin corresponding to the 1,2-alkanediol desired, or mixtures of 1,2-olefins, in the presence of formic acid. It is to be understood, however, that the invention is in nowise limited to the utilization of 1,2-alkanediols obtained by any specific method of preparation or from any specific source.

A particular advantage of the invention resides in the ability to produce emulsions of improved stability with the aid of synthetic organic emulsifying agents. Examples of such synthetic organic emulsifying agents which may be incorporated in the emulsifying compositions or emulsions comprised within the scope of the invention include salts of sulfated aliphatic alcohols containing at least seven carbon atoms. Included within the latter class of emulsifying agents are the salts of the secondary alkyl sulfuric acids obtained from olefins derived from cracked paraffin wax, for example, by the processes described in U. S. Patents 2,078,516, 2,152,292, 2,139,393, 2,172,228. Further examples of such synthetic organic emulsifying agents are the salts of primary alkyl sulfuric acids prepared, for example, from naturally occurring or synthetic fatty acid derivatives; the water-soluble salts of alkyl aryl sulfonic acids, such as dodecyl benzene sulfonic acid; salts of hydrophilic naphthasulfonates; salts of alkyl or aryl phosphoric acids; salts of carboxylic acids having emulsifying properties; cationic emulsifying agents; non-ionic emulsifying agents such as polyethylene oxide derivatives; and the like. The emulsifying agents are added in amounts sufficient to obtain the desired degree of emulsification. The amount added will of course vary in accordance with the nature of the specific emulsifier employed as well as with that of the individual components of the emulsion or emulsifying compositions.

In addition to the 1,2-alkanediol coupling agent or agents and the emulsifying agent, the emulsifying compositions or emulsions of the present invention may contain other ingredients known to be useful in emulsifying compositions or emulsions, e. g., one or more naphthenic acids; tall oil; fatty acids; ammonium or alkali metal salts of naphthenic acids, of tall oils, or of fatty acids; etc.

The emulsifying compositions of this invention are employed in the preparation of compositions of the soluble oil-, gel-, paste-, solution-, or droplet-emulsion type for industrial, insecticidal, fungicidal, pharmaceutical, veterinary and domestic purposes. In preparing the emulsifying compositions and emulsions comprised within the scope of the invention, the coupling agents may be added in part or entirety to the individual oil or emulsifier component, or to mixtures of the oil and emulsifier. In variations of the method of preparing the compositions the coupling agents may be dissolved in suitable solvents prior to addition to the oil and/or emulsifier components of the compositions. In the preparation of the emulsifying compositions concentrated compositions are usually first prepared to facilitate commercial distribution, although they are not generally employed in this form. Thus the emulsifying compositions of the present invention may be mixed with light mineral oils or lubricating oils to give soluble cutting oils of improved characteristics, particularly with respect to stability. Such soluble cutting oils are readily dispersed in practically all proportions of water to give extremely stable emulsions useful in the cold working of metals.

The term "oil" as employed in the present specification and appended claims to denote the oil component of the emulsifying compositions of the present invention is intended to include not only known mineral, vegetable and animal oils generally consisting wholly or substantially of carbon and hydrogen or of carbon, hydrogen and oxygen, but also oils modified by treatment such as the halogenated hydrocarbons, or organic liquids immiscible, or only slightly miscible, with aqueous media.

In the following examples, illustrative of, but not limiting the invention, all indicated parts are by volume unless otherwise stated.

*Example I*

Five parts of spindle oil and 4.1 parts of emulsifier known by the trade name "Teepol X" consisting essentially of an aqueous solution containing about 20% of sodium secondary alkyl ($C_{10}$–$C_{18}$) sulfates and 6% sodium sulfate, are mixed with a solution of 1,2-undecanediol in lauryl alcohol to result in a cutting oil readily dispersible in water to form stable emulsions.

*Example II*

Five parts of spindle oil and 3.8 parts of emulsifier known by the trade name "Teepol X" consisting essentially of an aqueous solution containing about 20% of sodium secondary alkyl ($C_{10}$–$C_{18}$) sulfates and 6% sodium sulfate, are mixed with 1.2 parts of a mixture consisting of equal parts of 1,2-octanediol and 1,2-undecanediol resulting in a clear soluble cutting oil readily dispersible in water to form stable emulsions.

*Example III*

6.4 parts of emulsifier known by the trade name "Teepol X" and consisting essentially of an aqueous solution containing about 20% of sodium secondary alkyl ($C_{10}$–$C_{18}$) sulfates and 6% sodium sulfate, are mixed with 0.6 part of 1,2-octanediol to result in an emulsifying composition which on the addition of 3 parts of carbon tetrachloride yields a stiff, clear gel readily dispersible in water.

*Example IV*

Eight parts of carbon tetrachloride are mixed with two parts of emulsifier known by the trade name "Teepol X" and consisting essentially of an aqueous solution containing about 20% of sodium secondary alkyl ($C_{10}$–$C_{18}$) sulfates and 6% of sodium sulfate, resulting in an unstable emulsion. 0.2 part of 1,2-octanediol are then added to the mixture and a clear stable dispersion results which can be further diluted with water without losing its stability.

The invention claimed is:

1. A water in oil emulsion readily dispersible in water consisting essentially of a mineral oil, water, a water-soluble sulfate salt of an aliphatic alcohol containing from seven to about eighteen carbon atoms to the molecule, and 1,2- octanediol.

2. A water in oil emulsion readily dispersible in water consisting essentially of a mineral oil, water, a water-soluble secondary alkyl sulfate salt, and 1,2-alkanediol.

3. A water in oil emulsion readily dispersible in water consisting essentially of a mineral oil, water, a water-soluble secondary alkyl sulfate salt, and 1,2-octanediol.

4. A water in oil emulsion readily dispersible in water consisting essentially of a mineral oil, water, a water-soluble secondary alkyl sulfate salt, and a straight chain saturated aliphatic dihydric alcohol having the hydroxyl groups in the 1,2-positions and having from seven to fourteen carbon atoms to the molecule.

5. A water in oil emulsion dispersible in water consisting essentially of spindle oil, water, the sodium salt of a secondary alkyl sulfate, and 1,2-octanediol.

6. A water in oil emulsion dispersible in water consisting essentially of spindle oil, water, a water-soluble sulfate salt of an aliphatic alcohol containing from seven to about eighteen carbon atoms in the molecule, and 1,2-octanediol.

7. A water in oil emulsion dispersible in water consisting essentially of spindle oil, water, a water-soluble secondary alkyl sulfate salt, and 1,2-octanediol.

8. A water in oil emulsion dispersible in water consisting essentially of a mineral oil, water, a water-soluble sulfate salt of an aliphatic alcohol having from seven to about eighteen carbon atoms to the molecule, and a straight chain saturated aliphatic dihydric alcohol having the hydroxy groups in the 1,2-positions and having from seven to fourteen carbon atoms to the molecule.

PHILIP JAMES GARNER.
PHILIP ALAN WINSOR.

REFERENCES CITED

The following references are of record in the file of this patent:

UNITED STATES PATENTS

| Number | Name | Date |
|---|---|---|
| 2,044,572 | Hollabaugh | June 16, 1936 |
| 2,088,020 | Wickert | July 27, 1937 |
| 2,338,522 | Liberthson | Jan. 4, 1944 |
| 2,350,782 | Lietz | June 6, 1944 |
| 2,374,474 | Dolian | Apr. 24, 1945 |
| 2,396,718 | Moscowitz | Mar. 19, 1946 |
| 2,470,913 | Bjorksten | May 24, 1949 |

FOREIGN PATENTS

| Number | Country | Date |
|---|---|---|
| 523,520 | Great Britain | July 16, 1940 |